US009438578B2

(12) United States Patent
Bansal et al.

(10) Patent No.: US 9,438,578 B2
(45) Date of Patent: Sep. 6, 2016

(54) DIGITAL COMMUNICATION BIOMETRIC AUTHENTICATION

(71) Applicant: AT&T Intellectual Property II, L.P., Atlanta, GA (US)

(72) Inventors: Pradeep K. Bansal, Monmouth Junction, NJ (US); Lee Begeja, Gillette, NJ (US); Carroll W. Creswell, Basking Ridge, NJ (US); Jeffrey Farah, North Brunswick, NJ (US); Benjamin J. Stern, Morris Township, NJ (US); Jay Wilpon, Warren, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

(21) Appl. No.: 13/969,513

(22) Filed: Aug. 17, 2013

(65) Prior Publication Data

US 2013/0340041 A1    Dec. 19, 2013

Related U.S. Application Data

(63) Continuation of application No. 11/248,211, filed on Oct. 13, 2005, now Pat. No. 8,533,485.

(51) Int. Cl.
*H04L 29/00*    (2006.01)
*H04L 29/06*    (2006.01)
*G06F 21/32*    (2013.01)
*G06F 21/31*    (2013.01)

(52) U.S. Cl.
CPC .............. *H04L 63/08* (2013.01); *G06F 21/316* (2013.01); *G06F 21/32* (2013.01); *H04L 63/0861* (2013.01); *G06F 2221/2115* (2013.01); *G06F 2221/2139* (2013.01)

(58) Field of Classification Search
CPC ....................................................... H04L 63/08
See application file for complete search history.

(56) References Cited

U.S. PATENT DOCUMENTS

| | | |
|---|---|---|
| 4,525,793 A | 6/1985 | Stackhouse |
| 4,757,525 A | 7/1988 | Matthews et al. |
| 4,998,279 A | 3/1991 | Weiss |
| 5,613,012 A | 3/1997 | Hoffman et al. |
| 5,717,743 A | 2/1998 | McMahan et al. |
| 5,940,793 A | 8/1999 | Attwater et al. |
| 6,094,632 A * | 7/2000 | Hattori ..................... 704/239 |
| 6,182,076 B1 | 1/2001 | Yu et al. |
| 6,317,834 B1 | 11/2001 | Gennaro et al. |

(Continued)

OTHER PUBLICATIONS

Heck, Larry P., "On the Deployment of Speaker Recognition for Commericial Applications: Issues and Best Practices", International Biometrics Consortium, Sep. 23, 2003, 47 pages.

(Continued)

*Primary Examiner* — Brandon Hoffman
*Assistant Examiner* — Helai Salehi
(74) *Attorney, Agent, or Firm* — Scott P. Zimmerman, PLLC

(57) ABSTRACT

A biometric authentication system is disclosed that provides authentication capability using biometric data in connection with a challenge for parties engaging in digital communications such as digital text-oriented, interactive digital communications. End-user systems may be coupled to devices that include biometric data capture devices such as retina scanners, fingerprint recorders, cameras, microphones, ear scanners, DNA profilers, etc., so that biometric data of a communicating party may be captured and used for authentication purposes.

16 Claims, 6 Drawing Sheets

(56) References Cited

U.S. PATENT DOCUMENTS

| | | | |
|---|---|---|---|
| 6,421,672 B1 | 7/2002 | McAllister et al. | |
| 6,909,708 B1 | 6/2005 | Krishnaswamy et al. | |
| 7,007,300 B1 | 2/2006 | Weber et al. | |
| 7,225,338 B2 | 5/2007 | Khan et al. | |
| 7,277,891 B2 | 10/2007 | Howard et al. | |
| 7,305,562 B1 | 12/2007 | Bianco et al. | |
| 7,613,659 B1 | 11/2009 | Hoffman et al. | |
| 7,856,558 B2 | 12/2010 | Martin et al. | |
| 7,861,312 B2 | 12/2010 | Lee et al. | |
| 8,234,494 B1 | 7/2012 | Bansal | |
| 8,655,789 B2 | 2/2014 | Bishop et al. | |
| 2001/0036297 A1 | 11/2001 | Ikegami et al. | |
| 2002/0104027 A1 | 8/2002 | Skerpac | |
| 2002/0188854 A1* | 12/2002 | Heaven | G06F 21/10 713/186 |
| 2003/0050777 A1 | 3/2003 | Walker, Jr. | |
| 2003/0126121 A1 | 7/2003 | Khan et al. | |
| 2004/0136386 A1 | 7/2004 | Miller et al. | |
| 2004/0162726 A1 | 8/2004 | Chang | |
| 2004/0172535 A1 | 9/2004 | Jakobsson et al. | |
| 2004/0249953 A1 | 12/2004 | Fernandez et al. | |
| 2005/0039056 A1* | 2/2005 | Bagga | G06F 21/31 726/19 |
| 2005/0170326 A1 | 8/2005 | Koehler et al. | |
| 2005/0273626 A1 | 12/2005 | Pearson et al. | |
| 2006/0090079 A1 | 4/2006 | Oh et al. | |
| 2006/0104485 A1 | 5/2006 | Miller et al. | |
| 2006/0206724 A1 | 9/2006 | Schaufele et al. | |
| 2006/0282671 A1 | 12/2006 | Burton | |
| 2007/0009140 A1 | 1/2007 | Jitsui et al. | |
| 2007/0055517 A1* | 3/2007 | Spector | 704/246 |
| 2007/0226511 A1 | 9/2007 | Wei et al. | |
| 2010/0061534 A1 | 3/2010 | Wang et al. | |
| 2013/0132091 A1* | 5/2013 | Skerpac | G10L 17/005 704/273 |

OTHER PUBLICATIONS

Liu et al., "A Practical Guide to Biometric Security Technology," IT Pro, Jan. 2001.

* cited by examiner

| | Biometric Data | Recordation Date/Time | Background | Mismatch History |
|---|---|---|---|---|
| Retina Scan | filename 1 | 08-12-94; 4:25 pm | | filename 2 |
| Finger Print | . | . | | . |
| Facial Image | . | . | | . |
| Voice Print | . | . | | . |
| ... | . | . | | . |
| Keyboard Signature | . | . | O | . |
| Grammar | . | . | | . |
| Syntax | . | . | | . |
| Word Usage | . | . | O | . |
| ... | . | . | | . |

Fig. 3

DIGITAL COMMUNICATION BIOMETRIC AUTHENTICATION

CROSS-REFERENCE TO RELATED APPLICATION

This application is a continuation of U.S. application Ser. No. 11/248,211 filed Oct. 13, 2005 and since issued as U.S. Pat. No. 8,533,485, and incorporated herein by reference in its entirety.

BACKGROUND

Digital communications may be anonymous. However, in many circumstances, authentication of communicating parties is needed. Thus, technology is required to provide authentication in digital communications.

SUMMARY

A biometric authentication system is disclosed that provides authentication capability using biometric data for parties engaging in digital communications such as digital text-oriented, interactive digital communications (DC) (e.g., instant messaging, email, etc.). End-user systems, such as personal computers (PCs), may be coupled to biometric data capture devices such as retina scanners, fingerprint recorders, cameras, microphones, etc., so that biometric data of a communicating party may be captured and used for authentication purposes.

The biometric authentication system may be initialized by potential communicating parties providing biometric templates for biometric data such as retina, fingerprint, voice print, facial image, etc. A template may be a pattern, a model, etc. that may be used to verify authenticity of received biometric data. The templates may be stored in a biometric data database so that a communicating party may be authenticated based on the stored templates.

Greater security may be obtained by using speaker verification (SV) where a communicating party is requested to speak a phrase that may be unique for each authentication challenge to generate audio input, for example. The audio input may be digitized into a voice print and features of the voice print may be extracted and compared against a stored voice print template. Additionally, the voice print may be converted to an audio signal and played for authentication by other communicating parties who can confirm not only the voice but also the spoken words based on the original phrase. In this way, it may be more difficult for a deceiving party to use an illicitly obtained copy of a biometric template.

When engaged in a digital communication, an end-user may challenge another communicating party to provide authentication data. When challenged, a communicating party may provide such data by using biometric data capture devices noted above. The captured biometric data may be returned to the challenging end-user, and the end-user system may confirm the received authentication data based on templates in a biometric database, for example. When confirmed, the end-user may continue digital communications. If authentication cannot be achieved, the end-user may commence deception processing which may include tracing the location of the unauthenticated communicating party, reporting the unauthenticated communication to monitoring parties such as law enforcement authorities, etc.

The biometric database may be stored in a third-party repository such as, for example, a repository offered by a network operator or a network service provider. For example, a service may be provided for potential communicating parties to register with a third party that stores biometric data for communicating parties in the repository. This repository may be controlled to protect the stored data. When requesting authentication of a communicating party, the end-user system may send biometric data received in response to a challenge to the third party for authentication based on data in the repository.

For example, the communicating party may be engaged in online customer service over a network, for example. A customer representative may request biometric data either to perform authentication processes itself or direct such data to the third party for authentication prior to sending protected information.

The end-user system may include background monitoring of digital communications and issue a warning to the end-user when the digital communications received from a communicating party exceeds a suspicion threshold. For example, the background monitoring may include heuristic signatures such as keyboard usage, word usage, grammar usage syntax usage, etc. extracted from the text of the digital communication. Such background monitoring may be effective when digital communications are between two assumed-known parties such as members of an instant messaging buddy list. Heuristic data may be captured and shared among the members of the buddy list and used as suspicion thresholds to determine whether a communicating party's keyboard usage comes under suspicion, for example. When the suspicion threshold is exceeded, the end-user system may either send a suspicion warning to the end-user by displaying an appropriate icon on the PC screen, for example, so that the end-user may decide whether to issue a challenge or to stop communication. Alternatively, the end-user system may automatically issue a challenge to the other communicating party to request authentication data.

In addition to the customer service and instant messaging environments, the biometric authentication system may also be used to control digital communications. For example, in parental control environments, a parent may permit a child to communicate only with approved parties. In such an application, the child's system may include permitted communicating parties' biometric data. While the child is surfing on a network such as the Internet, for example, the child's system may request biometric data from all contacting parties before connecting a communicating party to a browser for viewing by the child. Various vendors, for example, may have assigned employees whose biometric data may be provided for authentication purposes. In this way, a parent may control a child's network environment permitting only approved communicating parties to communicate with their child.

In addition to the above "parental control" system, biometric authentication may be used for other purposes such as confirming authorization for access to wireless resources such as satellite TV or radio, for example. A set-top box, when used for digital text-based communications, may include biometric data capture devices such as retina scanners or fingerprint recorders so that prior to downloading protected information, a user's biometric data may be required for authentication purposes. Biometric authentication may be used in many other digital communication environments such as cell phones, PDAs, facsimiles, emails, etc.

BRIEF DESCRIPTION OF THE DRAWINGS

The invention is described in detail with reference to the following figures, wherein like numerals reference like elements, and wherein:

FIG. 3 shows an exemplary database for biometric data;

DETAILED DESCRIPTION OF EMBODIMENTS

Figure 1:
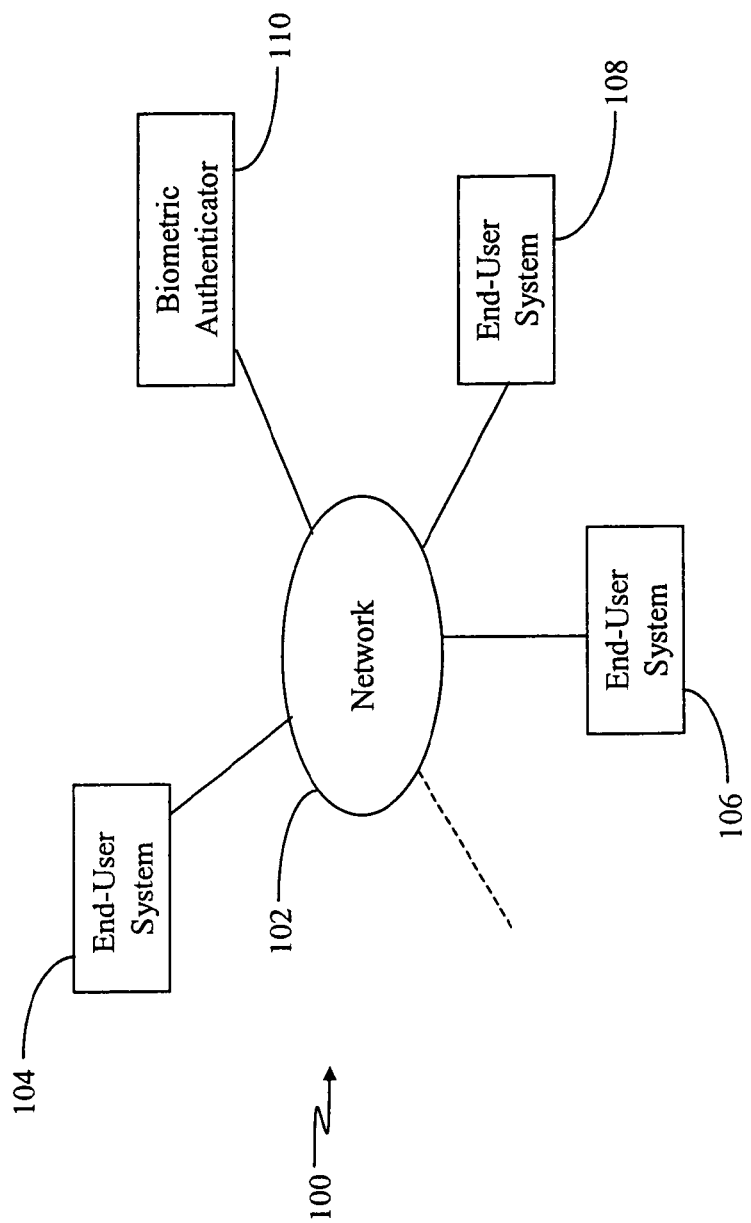
FIG. 1 shows an exemplary diagram of a biometric authentication system.

FIG. 1 shows an exemplary diagram of a biometric authentication system 100 that may include end-users such as end-users 104-108 interconnected by a network 102. Network 102 may be the Internet, for example, or may be a peer-to-peer network having direct connections between end-users 104-108. Any type of networks may be included such as intranets, local area networks (LANs), wide area networks (WANs), wireless, wired, etc. If desired, a biometric authenticator 110 may also be included and coupled to network 102 so that biometric authentication may be performed by a third party acting as biometric authenticator 110. Such a third party may be an element within the network 102, for example.

When end-user systems 104-108 communicate with each other, any of end-user systems 104-108 may challenge another end-user system 104-108 for authentication. When challenged by end-user system 104, end-user system 106 may request an end-user to provide biometric data via biometric data capture devices such as a retina scanner, a fingerprint recorder, a camera and/or a microphone, for example. When the biometric data is provided, end-user system 106 may send the captured data to end-user system 104 that may authenticate the received biometric data based on templates in a biometric database. If a match is obtained and a corresponding identification of the end-user is acceptable, communication between end-user systems 104 and 106 may continue. Otherwise, a deception event has occurred and appropriate deception processing may be executed.

Instead of an end-user system, a third party may perform the biometric authentication process, such as biometric authenticator 110. For example, end-user of end-user system 104 may subscribe to such a biometric authentication service. Thus, the challenge issued by end-user system 104 to end-user system 106, for example, may include a pointer to biometric authenticator 110 to direct the captured biometric data to biometric authenticator 110 for authentication. End-user system 106 may send the biometric data to either end-user system 104 for forwarding to biometric authenticator 110, or directly to biometric authenticator 110.

Biometric authenticator 110 may include large repositories of biometric data and may perform the authentication function by matching the biometric data with the data in the repository. The repository may be initiated by subscribers providing their biometric data as templates, for example. The repository may be organized by end-user system account numbers, and each end-user system account may include biometric data of communicating parties as specified by the end-user of end-user system 104 (e.g., instant messaging buddy list). When a match is found in an authentication process, an authentication certificate may be provided so that the end-user of end-user system 104, for example, may make the final authentication decision, and whether to continue communication or not.

As noted above, biometric authentication system 100 described above may be used for personal communication such as instant messaging, for example. A challenge may be issued at any time: at the beginning, during or after an instant messaging session between end-user systems 104 and 106. For example, the challenge may request end-user of end-user system 106 to speak the last four words of a prior message. The audio signal received by a microphone of end-user system 106 may be digitized into a voice print. Features extracted from the voice print may be transmitted to end-user system 104 for speaker verification. The voice print may be converted into an audio signal and output to the end-user of end-user system 104 for audio confirmation in addition to automated authentication. Instead of requesting the end-user of end-user system 106 to speak portions of the prior message, a large corpus of phrases or a source of random words may be used to generate a phrase in end-user system 104 and transmitted as part of the challenge for the end-user of end-user system 106 to speak. This technique may avoid imposters from stealing a speech sample and use it to spoil the authentication process. The phrases or words may be saved for later uses or for guaranteeing that the phrases are not used again, or the phrases or words may be deleted to avoid copying by imposters. As noted above, the authentication process may be performed by a third-party biometric authenticator 110. In the instant messaging environment, biometric authenticator 110 may be an instant messaging server that maintains a biometric database for biometric authentication.

In a more commercial environment, biometric data authentication may be used to determine whether a party making a purchase via text-based interactions is in fact the party represented by a credit card number, for example. Consumers may register their identities by providing biometric data to a third-party authenticator service such as biometric authenticator 110. During a transaction, a consumer may provide biometric data to a vendor over the network, for example. The vendor may request biometric authenticator 110 to confirm identity via prior registered biometric data. In this way, illicit activity such as stolen credit cards may be avoided and greater confidence may be obtained in online commercial activities. For example, the vendor may request a prospective purchaser to speak a provided phrase. Biometric authenticator 110 may be provided the selected phrase and the obtained voice print for authentication.

In a banking environment such as online banking, bank organizations may obtain biometric data such as fingerprints, retinal scans, voice prints, ear scans, DNA profiles, etc., during account application. When customers are engaging in online banking, biometric data may be requested for authentication prior to making transactions.

Other applications may include restricting communication of controlled individuals. End-user systems 104-108 may be programmed to communicate only with authenticated communicating parties, for example. Under this scenario, prior to establishing communication with a communicating party, an end-user system 104-106 may first request biometric data for authentication purposes. For example, the potential communicating party may be requested to speak a provided text, as mentioned above, and either the voice print or features extracted out of the voice print may be provided as biometric data for authentication. Communication may be established only when authentication is successful.

For example, a parent may use a biometric data communication system to construct a safe environment for a child. Various vendors and websites may register biometric data with third-party service providers such as biometric authenticator 110. When the child attempts to access a website, the end-user system used by the child may first challenge the selected website and only allow access to the website when biometric data authentication is achieved. Further, real-time voice print authentication may be used to avoid imposters from communicating based on stolen biometric data.

While requiring real-time authentication such as voice prints may be difficult to obtain for websites, live communicating parties may be easily screened in this way. For example, when the child is communicating via instant messaging with others on a buddies list, real-time biometric data such as voice prints, retina scans or fingerprint recordings may prevent unauthorized persons from illicit accesses to the child.

While the above discussion used the personal computer as an example of an end-user system, other types of digital communication may also incorporate biometric data authentication. For example, cell phone communication may automatically use the audio communication to perform biometric authentication so that if the biometric data does not match that of a communicating party assumed to be associated with a corresponding telephone number, the cell phone user may be alerted of a potential deception. Communications via personal digital assistants (PDAs), facsimile transmissions, emails, etc., may all take advantage of biometric data authentication. Also, while biometric data communications in IDC and cell phone environments may be more real-time, non-real-time biometric authentication may be more appropriate for e-mail and facsimile environments. In these circumstances, the authentication may be received much later than the communication content, but provides confidence of whether the source of the communication is as alleged.

Figure 2:
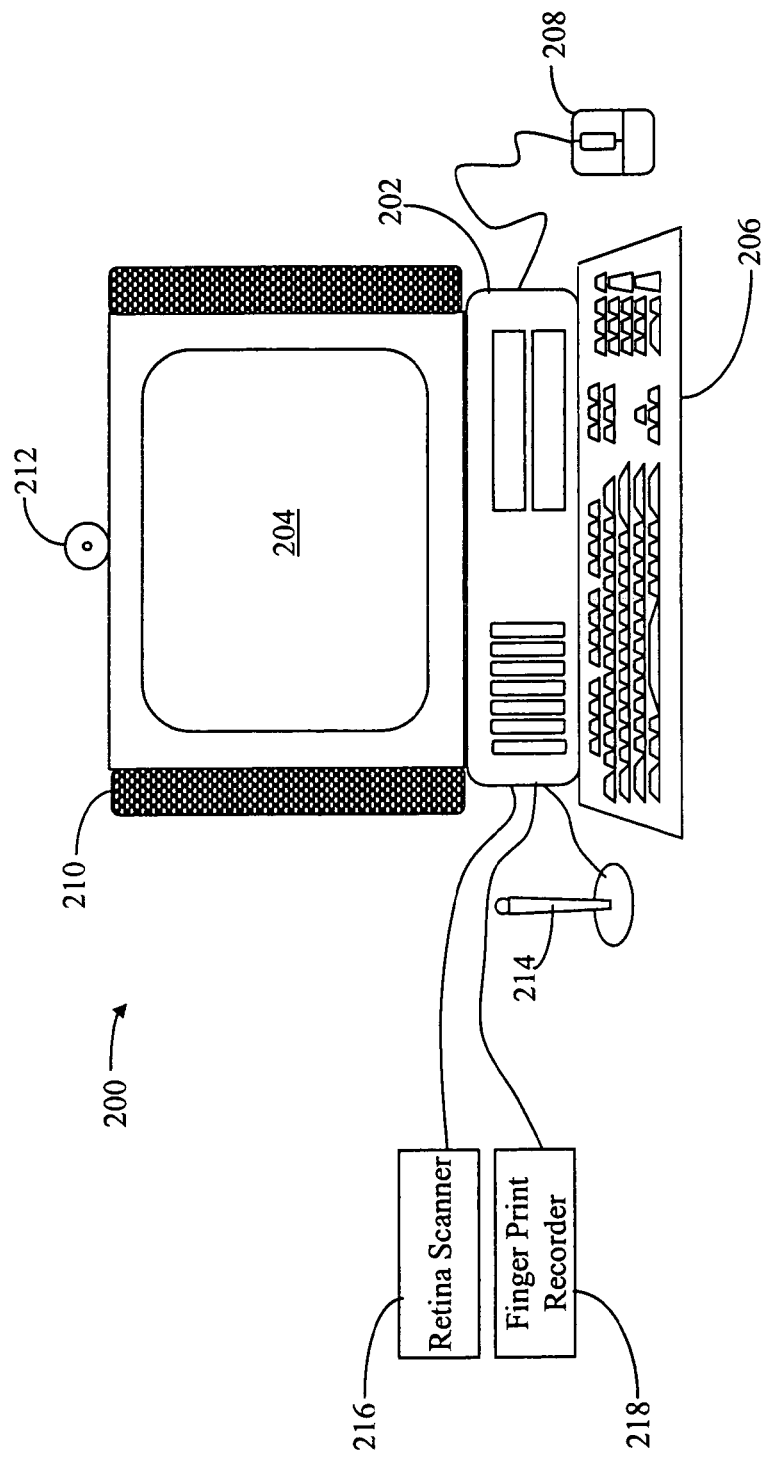
FIG. 2 shows an exemplary end-user system.

FIG. 2 shows an exemplary end-user system 200 that includes a control processor 202, a display 204, a keyboard 206, a mouse 208, speakers 210, a camera 212, a microphone 214, a retina scanner 216 and a fingerprint recorder 218. While FIG. 2 shows that the end-user system 200 includes many different types of biometric data capture devices 212-218, an end-user system may include any combination of one or more of these biometric data capture devices 212-218 as well as other types of biometric data capture devices such as DNA profiler, ear scanner, etc. For example, an end-user system may include only microphone 214 to receive an audio input so that control processor 202 may generate a voice print, for example. Also, biometric data capture devices 212-218 may be combined into a single device that is capable of capturing all types of the above-mentioned and other biometric data.

Control processor 202 may maintain a biometric database 240 as shown in FIG. 3 to provide biometric authentication capability. Exemplary biometric database 240 may include one of records 242-246 of biometric data for each potential communicating party, for example. Records 242-246 contain biometric data for "Jerry," "Barbara" and "Tom," respectively. Each of records 242-246 may include an identification field 248, multiple biometric data entries 252 where each biometric entry may include multiple fields 250. For example, Jerry's record 242 may include entries for a retina scan, a fingerprint, a facial image, a voice print. Fields 250 may include information such as actual biometric data, recordation date/time, whether the biometric data should be used for a background monitoring and any mismatch history, for example.

The above-discussed biometric data entries and corresponding fields are examples only. Other different types of biometric data and fields may be added, or only a subset of the above-discussed biometric entries 252 and fields 250 may be used. Also, although FIG. 3 shows biometric data stored in a table-like manner, other database structures may be used such as relational databases having indices, link lists, etc. Databases similar to database 240 may be stored in any end-user systems 104-106 or third party systems such as biometric authenticator 110. Sophisticated database structures may be used in biometric authenticator 110 because a much larger volume of biometric data may be stored.

The recordation date/time field of each biometric data entry provides an indication of the age of the biometric data. Depending on the type of biometric data, such as facial image, an elapsed time limit may be set for updating the biometric data. For example, when an elapsed time threshold is exceeded, an end-user system 104-106 may automatically request a new facial image during the next communication with the corresponding communicating party. In this way, biometric data may be continuously updated as may be required.

The mismatch history field may include a number of times mismatches have occurred for a particular type of biometric data. This field may be used as a measure of the quality of the biometric data. For example, if the mismatch history indicates a higher mismatch rate for retina scans when the communicating party is known to be authentic, then appropriate match thresholds may be adjusted or the retina scan match results may be given less weight. If a trend of increasing mismatches is detected, this trend may indicate failure of a biometric data capture device and action may be required for maintenance operation, for example.

The mismatch history may also be used to indicate possible deception attempts. For example, if the voice print for biometric record 242 encounters mismatches that does not normally occur, suspicion may be raised as to whether a deception is in progress. For example, if only a voice print was used for authentication, then such a mismatch may form the basis for requesting an additional type of biometric data such as a facial image or a retina scan. In this way, possible deceptions may be identified and various techniques may be applied to avoid deception.

Because mismatches for any one of the biometric data may normally occur, various algorithms may be applied to establish thresholds to determine matches. Additionally, algorithms that provide different weights for the various types of biometric data may be used so that all of the biometric data may contribute in an authentication process.

Unlike biometric data entries 252, which are text-independent, entries 254 (keyboard, grammar, syntax, word, etc. usages) may be text-dependent and thus, strictly speaking, are not biometric data. However, entries 254 may be characteristic of a particular person so that this type of text-dependent data may be used to contribute to a suspicion parameter. If the suspicion parameter exceeds a suspicion threshold, then a suspicion warning may be provided so that end-users may choose to challenge the other communicating party for authentication. The background field may be initialized either by default or by an end-user to indicate which of the text-dependent entries should be used in a background monitoring process for determining whether a suspicion warning should be generated. Similar to the biometric data, mismatch histories may be used as one of the parameters to determine whether a suspicion warning should be generated.

Figure 4:
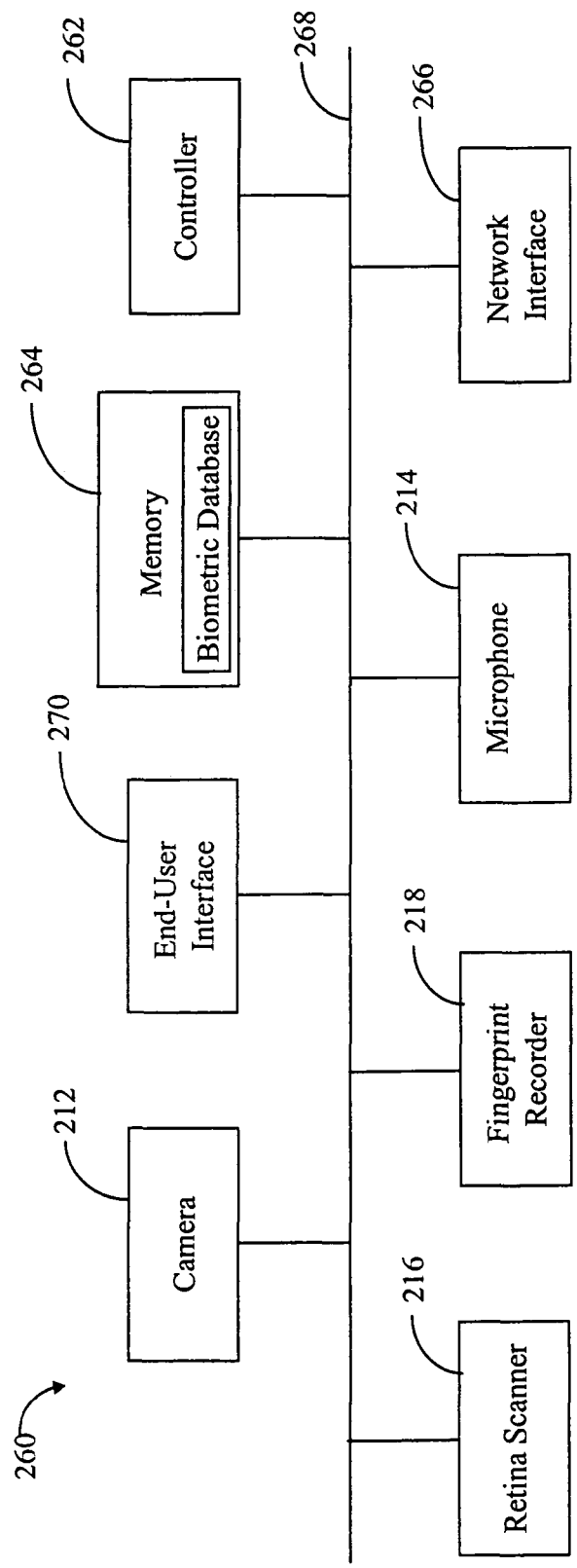
FIG. 4 shows an exemplary block diagram of the end-user system.

FIG. 4 shows an exemplary block diagram of an end-user system 260 that includes a controller 262, a memory 264 (hard disk, CD, RAM, ROM, PROM, etc.) that may include a biometric database, camera 212, microphone 214, retina scanner 216, fingerprint recorder 218 and a network interface 266. These components may be coupled together via a bus 268. While FIG. 4 shows end-user system 260 in a bus architecture, any type of hardware architecture, including wired and wireless networks, may be used based on implementation details. For example, camera 212 may be coupled to the controller 262 through a wireless network interface, microphone 214, fingerprint recorder 218 and retina scanner 216 may be coupled to controller 216 via USB interfaces while memory 264 and network interface 266 may be coupled to controller 262 via back-plane buses. Also, these hardware components may be implemented using any available hardware technology such as FPGA, PAL, application specific integrated circuits (ASICs), etc.

An end-user may choose to challenge another communicating party at any time such as when first contacted by a new communicating party, when suspicion is raised regarding the identity of a communicating party during the course of communication, or at the end of a communication. The end-user may choose to program the end-user system to automatically challenge every new communicating party, for example.

If a contact from a new communicating party is received either while an end-user is not communicating with anyone or while the end-user is surfing the network via network interface 266, for example, controller 262 may be programmed to issue an immediate challenge for authentication. If so programmed, controller 262 may issue such a challenge via network interface 266 and delay connecting the end-user with the new communicating party until authentication is complete. If the authentication data is received, controller 262 may either authenticate the new communicating party via a biometric database stored in memory 264 or forward the received biometric data to a third party such as biometric authenticator 110 via network interface 266. As noted above, the challenge issued by controller 262 may also include an instruction to send biometric data to the third party directly and the controller 262 may receive a message from the third party via network interface 266 that the new communicating party is either authenticated or not. Tithe new communicating party is authenticated, then controller 262 may alert the end-user via end-user interface 270 that contact from the new communicating party has been received. If not authenticated, then controller 262 may begin deception processing such as recording biometric data mismatch in biometric database, alerting other parties such as law enforcement, deception monitoring entities, etc.

Suspicion regarding the identity of a communicating party may arise from many sources. For example, if the communicating party begins to discuss subject matter not expected or not characteristic of the assumed person, then the end-user may choose to issue a challenge to authenticate the suspected communicating party. The end-user may also choose to incorporate background monitoring using text-dependent data to generate suspicion warnings.

For example, while the end-user is communicating with other communicating parties, controller 262 may be executing background monitoring of various communicating parties by using text-dependent data such as keyboard, grammar, word, syntax, etc. usages. The text-dependent data may be processed to extract features which may be confirmed based on assumed communicating party's text-dependent signatures. If a number of mismatches exceeds a suspicion threshold, for example, then controller 262 may issue a suspicion warning to the end-user via a display such as display 204, for example. The end-user may issue a challenge based on the suspicion warning to authenticate the communicating party.

If while communicating with communicating parties, end-user system 260 receives a challenge, then controller 262 may issue a request to the end-user to generate biometric data by displaying the request on the display 204, for example. The display 204 may indicate one or more requested types of biometric data such as a retina scan, a fingerprint, voice print by speaking a displayed phrase or a facial image, for example. Controller 262 may set a timer within which the end-user is expected to provide the requested biometric data. If the biometric data is received within a specified amount of time, controller 262 may transmit the biometric data to a destination that may be specified in the received challenge. Then, controller 262 may wait either for a communication-resume indication or simply the receipt of the next communication message. If the end-user does not provide the requested biometric data within the specified amount of time, controller 262 may log the event and save any related data for later analysis and end the communication. For example, the end-user system may have been hijacked by an imposter.

Figure 5:
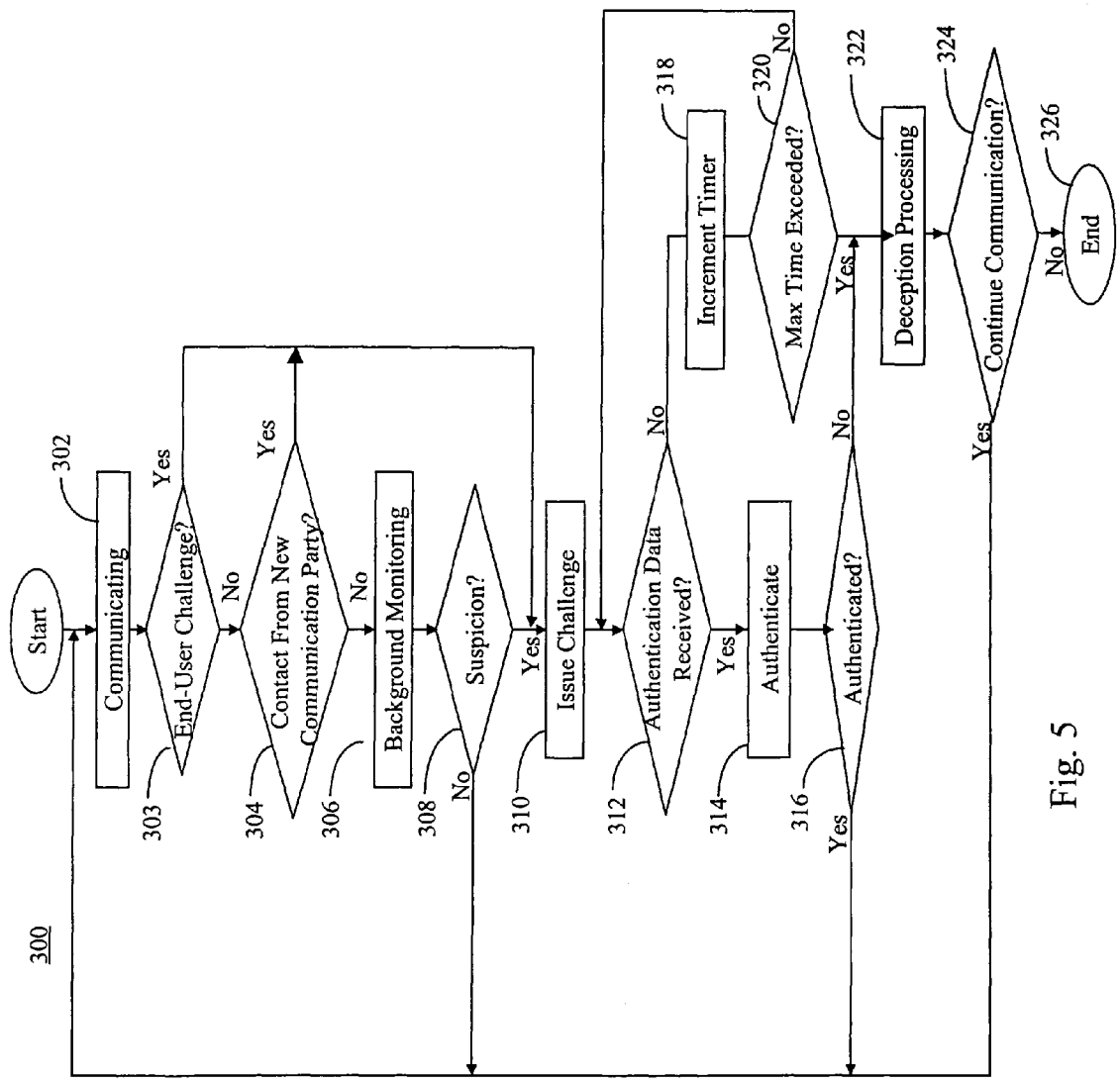
FIG. 5 shows a flowchart of an exemplary process issuing a challenge.

FIG. 5 shows a flowchart 300 of an exemplary process for issuing challenges and authenticating received authentication data. In step 302, an end-user is engaging in communication and the process moves to step 303. In step 303, the process determines whether the end-user is suspicious of the other communicating party and desires to issue a challenge. If an end-user challenge is received, the process goes to step 310; otherwise the process goes to step 304. In step 304, the process determines whether a contact from a new communicating party is received. If a contact is received, the process goes to step 310; otherwise, the process goes to step 306. In step 306, the process may perform background monitoring of current communicating parties using text-dependent data, for example, and goes to step 308. In step 308, the process determines whether a suspicion warning should be issued. If a suspicion warning should be issued, the process goes to step 310; otherwise, the process returns to step 302.

In step 310, the process issues a challenge to the contacting communicating party, a communicating party that caused the suspicion warning, or a communicating party identified by the end-user and the process goes to step 312. In step 312, the process determines whether authentication data has been received. The authentication data may be biometric data transmitted by the challenged communicating party or a third party that is providing biometric data authentication services. If the authentication data is received, the process goes to step 314; otherwise, the process goes to step 318. In step 318, the process increments a timer and goes to step 320. In step 320, the process determines whether a maximum time has been exceeded. If the maximum time has been exceeded, the process goes to step 322; otherwise, the process returns to step 312.

In step 314, the process authenticates the communicating party either by confirming that the authentication process was successful by the third party service or by confirming received biometric data based on templates in the biometric database to confirm that the communicating party is authentic, and the process goes to step 316. In step 316, the process determines whether the authentication was successful. If the authentication was successful, the process returns to step 302; otherwise, the process goes to step 322. In step 322, the process performs deception processing such as alerting various monitoring parties and recording biometric data mismatches as may be appropriate, and the process goes to step 324. In step 324, the process determines whether the communication is to be continued. For example, the end-user may choose to continue in spite of a lack of authentication. If the communication process is to be continued, the process returns to step 302; otherwise the process goes to step 326 and ends.

Figure 6:
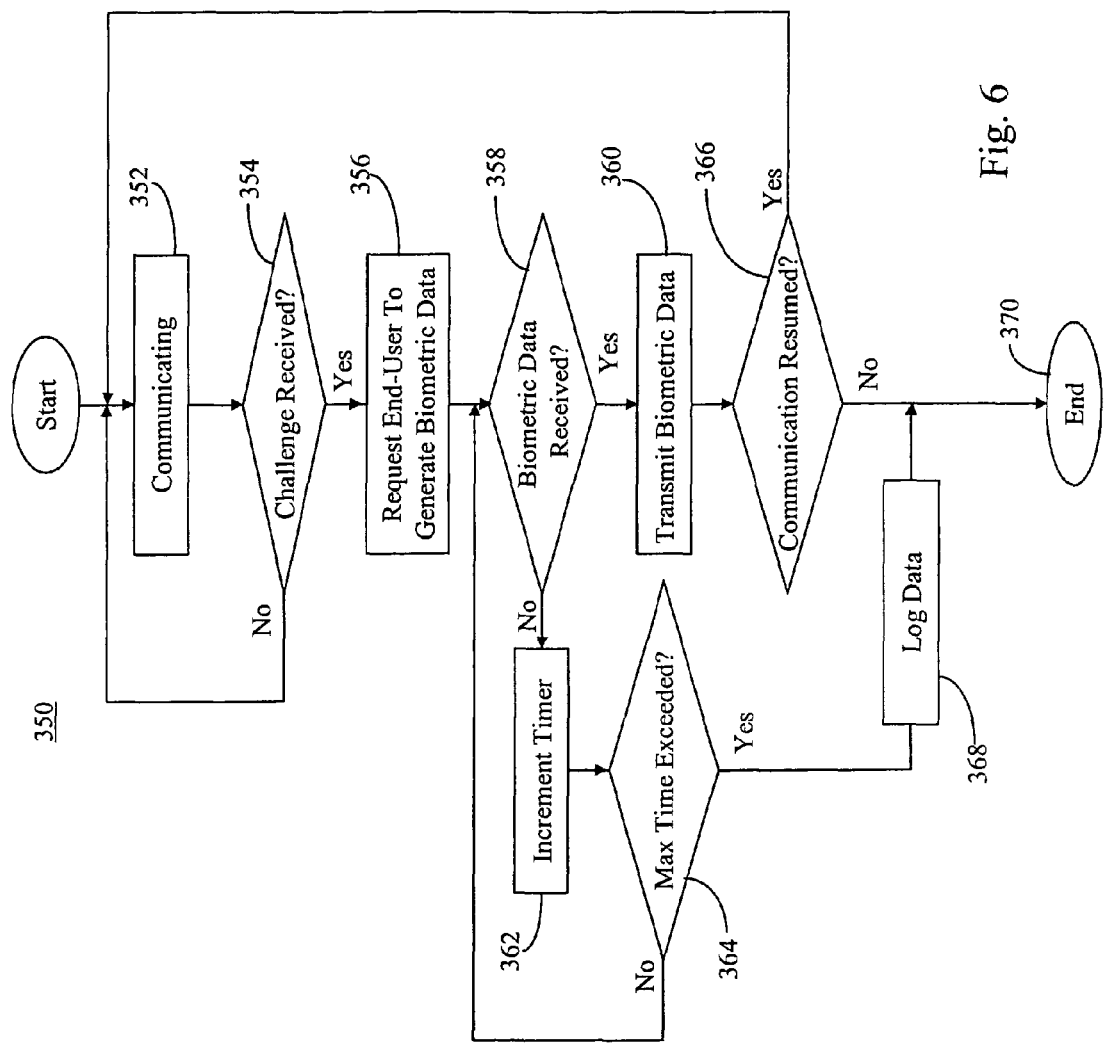
FIG. 6 shows a flowchart of an exemplary process for responding to a challenge.

FIG. 6 shows a flowchart 350 of an exemplary process for responding to a challenge. In step 352, the end-user is engaging in communication and the process goes to step 354. In step 354, the process determines whether a challenge has been received. If a challenge has been received, the process goes to step 356; otherwise, the process returns to step 352. In step 356, the process requests the end-user to generate biometric data. As discussed above, biometric data may be generated by using a retina scanner, a fingerprint recorder, speaking into a microphone, capturing an image with a camera, an ear scanner, etc. Then the process goes to step 358.

In step 358, the process determines whether biometric data has been received. If the biometric data has been received, the process goes to step 360; otherwise, the process goes to step 362. In step 362, the process increments a timer and goes to step 364. In step 364, the process determines whether a maximum time has been exceeded. If the maximum time has been exceeded, the process goes to step 368; otherwise, the process returns to step 358. In step 368, the process may log appropriate data to record biometric data capture failure or saving records for later analysis for possible system hijack, for example, and goes to step 370 and ends. In step 360, the process transmits the received biometric data to a destination indicated in the received challenge. For example, the received challenge may indicate that the biometric data should be returned to the requesting end-user system, or the biometric data should be sent to a third party biometric data authenticator. Also, it may be made implicit where the biometric data is to be sent and no indication in the challenge is required. For example, in the instant messaging environment, biometric data authentication may be assumed to be performed by an instant messaging server. Then, the process goes to step 366. In step 366, the process determines whether the communication has resumed. As noted above, the process may determine that the communication has resumed either by receiving a communication-resume indication from the challenging end-user system or by receiving a next communication message. If the communication is resumed, the process returns to step 352; otherwise, the process goes to 370 and ends.

It should be appreciated that various of the above-disclosed and other features and functions or alternatives thereof, may be desirably combined into many other different systems or applications. Also, variously presently unforeseen or unanticipated alternatives, modifications, variations or improvements therein may be subsequently made by those skilled in the art, and are also intended to be encompassed by the following claims.

The invention claimed is:

1. A method of authentication, comprising:
receiving, at an authentication server, a spoken response to a challenge issued between parties of an email communication;
retrieving, by the authentication server, a textual representation of N integer words contained within the spoken response;
querying, by the authentication server, an electronic database for the textual representation of the N integer words contained within the spoken response, the electronic database storing different electronic email messages previously exchanged between both of the parties;
receiving, by the authentication server, a confirmation that the textual representation of the N integer words matches at least a portion of one of the different electronic email messages previously exchanged between the parties; and
sending, from the authentication server, an authentication message to the parties of the email communication, the authentication message confirming identities associated with the parties of the email communication.

2. The method of claim 1, further comprising storing the textual representation of the N integer words in the electronic database.

3. The method of claim 1, further comprising querying the electronic database for one of the parties of the email communication.

4. The method of claim 1, further comprising querying the electronic database for the both of the parties of the email communication.

5. The method of claim 1, further comprising retrieving the N integer words from an audio signal.

6. The method of claim 1, further comprising retrieving the textual representation of the N integer words.

7. A system, comprising:
a processor; and
a memory device, the memory device storing instructions, the instructions when executed causing the processor to perform operations, the operations comprising:
receiving a spoken response to a challenge issued between a sender and a recipient associated with an electronic email message;
determining, from the spoken response, a textual representation of N integer text words contained within the spoken response;
querying an electronic database for the textual representation of the N integer text words, the electronic database storing text contained within different electronic email messages previously exchanged between the sender and the recipient;
receiving a confirmation that the textual representation of the N integer text words matches at least a portion of one of the different electronic email messages previously exchanged between the sender and the recipient; and
sending an authentication message to the sender and to the recipient, the authentication message confirming identities associated with the sender and the recipient.

8. The system of claim 7, wherein the operations further comprise storing the textual representation of the N integer text words in the electronic database.

9. The system of claim 7, wherein the operations further comprise querying the electronic database for one of the sender and the recipient.

10. The system of claim 7, wherein the operations further comprise querying the electronic database for both of the sender and the recipient.

11. The system of claim 7, wherein the operations further comprise retrieving the textual representation of the N integer text words.

12. A memory device storing instructions that when executed cause a processor to perform operations, the operations comprising:
receiving a spoken response to a challenge issued between parties of an email communication;

determining, from the spoken response, a textual representation of N integer words;

querying an electronic database for the textual representation of the N integer words, the electronic database storing different email messages previously exchanged between the parties;

receiving a confirmation that the textual representation of the N integer words matches at least a portion of one of the different electronic email messages previously exchanged between both the parties; and sending an authentication message to the parties to the email communication, the authentication message confirming identities associated with the parties of the email communication.

13. The memory device of claim 12, wherein the operations further comprise storing the textual representation of the N integer words in the electronic database.

14. The memory device of claim 12, wherein the operations further comprise querying the electronic database for one of the parties of the email communication.

15. The memory device of claim 12, wherein the operations further comprise querying the electronic database for the both of the parties of the email communication.

16. The memory device of claim 12, wherein the operations further comprise retrieving the textual representation of the N integer words.

\* \* \* \* \*